United States Patent
Chen et al.

(10) Patent No.: US 7,203,676 B2
(45) Date of Patent: Apr. 10, 2007

(54) DYNAMIC PERFORMANCE VIEWS WITH A PARALLEL SINGLE CURSOR MODEL

(75) Inventors: Rushan Chen, Belmont, CA (US); Bhaskar Ghosh, Burlingame, CA (US); Thierry Cruanes, Redwood City, CA (US); Patrick A. Amor, Menlo Park, CA (US); Benoit Dageville, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 459 days.

(21) Appl. No.: 10/898,300

(22) Filed: Jul. 23, 2004

(65) Prior Publication Data

US 2005/0131878 A1 Jun. 16, 2005

Related U.S. Application Data

(63) Continuation-in-part of application No. 10/901,411, filed on Jul. 27, 2004, and a continuation-in-part of application No. 10/865,178, filed on Jun. 9, 2004, and a continuation-in-part of application No. 10/841,991, filed on May 6, 2004, and a continuation-in-part of application No. 10/824,887, filed on Apr. 13, 2004.

(60) Provisional application No. 60/530,413, filed on Dec. 16, 2003.

(51) Int. Cl.
*G06F 17/30* (2006.01)

(52) U.S. Cl. ............................... 707/3; 707/100; 707/2; 707/4

(58) Field of Classification Search .................... None
See application file for complete search history.

(56) References Cited

U.S. PATENT DOCUMENTS

| | | | |
|---|---|---|---|
| 5,325,525 A | 6/1994 | Shan et al. | 718/104 |
| 5,765,146 A | 6/1998 | Wolf et al. | 707/2 |
| 6,081,801 A | 6/2000 | Cochrane et al. | 707/3 |
| 7,051,034 B1 | 5/2006 | Ghosh et al. | 707/100 |
| 2003/0055813 A1 | 3/2003 | Chaudhuri et al. | 707/3 |
| 2005/0131890 A1 | 6/2005 | Cruanes et al. | 707/4 |
| 2005/0132383 A1 | 6/2005 | Ghosh et al. | 719/312 |

*Primary Examiner*—Charles Rones
*Assistant Examiner*—Belix M. Ortiz
(74) *Attorney, Agent, or Firm*—Hickman Palermo Truong & Becker LLP

(57) ABSTRACT

A query coordinator handles a multiple-server dynamic performance query by sending remote query slaves (1) first information for generating a complete plan for the query, and (2) second information for participating in the dynamic performance view portion of the query. If the slaves on the remote servers are unable to use the first information to generate an equivalent query (for example, if they reside in a database server that has closed the database), then the slaves on the remote servers use the second information to participate in the dynamic performance view portion of the query.

30 Claims, 2 Drawing Sheets

DYNAMIC PERFORMANCE VIEWS WITH A PARALLEL SINGLE CURSOR MODEL

PRIORITY CLAIM/RELATED CASES

This application claims the benefit of priority from U.S. Provisional Application Ser. No. 60/530,413, entitled "Parallel Shared Cursors" filed Dec. 16, 2003, which is incorporated by reference in its entirety for all purposes as if fully set forth herein.

This application is a continuation-in-part of U.S. patent application Ser. No. 10/824,887, entitled "COMPILATION AND PROCESSING A PARALLEL SINGLE CURSOR MODEL", filed on Apr. 13, 2004, the contents of which are incorporated herein, in their entirety, for all purposes.

This application is a continuation-in-part of U.S. patent application Ser. No. 10/841,991, entitled "EXECUTING FILTER SUBQUERIES USING A PARALLEL SINGLE CURSOR MODEL", filed on May 6, 2004, the contents of which are incorporated herein, in their entirety, for all purposes.

This application is a continuation-in-part of U.S. patent application Ser. No. 10/865,178, entitled "COMMUNICATING EXTERNAL EXPRESSIONS USING A PARALLEL SINGLE CURSOR MODEL", filed on Jun. 9, 2004, the contents of which are incorporated herein, in their entirety, for all purposes.

This application is related to U.S. patent application Ser. No. 10/901,411, entitled "PARALLEL SINGLE CURSOR MODEL ON MULTIPLE-SERVER CONFIGURATIONS", filed on Jul. 27, 2004.

This application is related to:

U.S. patent application Ser. No. 10/930,433, entitled "EXECUTING NESTED SUBQUERIES OF PARALLEL TABLE FUNCTIONS IN THE PARALLEL SINGLE CURSOR MODEL", filed on Aug. 30, 2004;

U.S. patent application Ser. No. 10/944,175, entitled "EXECUTING A PARALLEL SINGLE CURSOR MODEL", filed on Sep. 16, 2004;

the contents of all of which are incorporated herein, in their entirety, for all purposes.

FIELD OF THE INVENTION

The present invention relates to managing data and, more specifically, to parallelizing operations that involve managing data in multiple-server systems.

BACKGROUND

Database applications interact with a database server by submitting to the database server commands that cause the database server to perform operations on data stored in a database. A database command that is sent from a database application to a database server contains the "original statement" of the database command.

For the database server to process the commands, the commands must conform to a database language supported by the database server. One database language supported by many database servers is known as the Structured Query Language (SQL).

When a database server receives the original statement of a database command from a database application, the database server must first determine which actions should be performed in response to the database command, and then perform those actions. The act of preparing for performance of those actions is generally referred to as "compiling" the database command, while performing those actions is generally referred to as "executing" the database command.

Various database languages, such as SQL, support special-purpose constructs referred to herein as "cursors". During the compilation of a query statement, the database server may perform a significant amount of preliminary work for the statement, such as parsing, semantic analysis, and query plan generation. A cursor stores the results of much of this preliminary work. For example, one set of information stored in a cursor includes the execution plan for performing the operations specified by the SQL statement.

One method of representing an execution plan is a row-source tree. At execution, traversal of a row-source tree from the bottom up yields a sequence of steps for performing the operation(s) specified by the SQL statement. A row-source tree is composed of row-sources. During the compilation process, row-sources are allocated, and each row-source is linked to zero, one, two, or more underlying row-sources. The makeup of a row-source tree depends on the query and the decisions made by a query optimizer during the compilation process. Typically, a row-source tree is comprised of multiple levels. The lowest level, the leaf nodes, access rows from a database or other data store. The top row-source, the root of the tree, produces, by composition, the rows of the query that the tree implements. The intermediate levels perform various transformations on rows produced by underlying row-sources.

The row-source tree representation of execution plans is described in detail in U.S. Pat. No. 5,857,180, entitled "Method and apparatus for implementing parallel operations in a database management system", issued to Hallmark et al on Jan. 5, 1999, the entire contents of which are incorporated herein. Hallmark also describes a "row-source approach" for parallelizing the operations required by an SQL command by parallelizing portions of the execution plan of the query. The row-source approach to parallelizing queries is described in greater detail below.

Multiple-Server Database Systems

A typical relational database management system includes a database and a database server. Typically, every time a database system is started, a system global area (SGA) is allocated and certain background processes are started. The combination of the background processes and memory buffers is referred to as a database server.

To take advantage of some hardware architectures (for example, shared disk systems) where multiple computers share access to data, software, or peripheral devices, multiple database server can share a single physical database. This allows users from several computers to access the same physical database with increased performance.

Dynamic Performance Views

A view is a logical table. As logical tables, views may be queried by users as if they were a table. A dynamic performance view (V$ view) is a view that provides, through the SQL interface, performance information. Performance information provided by a dynamic performance view may include, for example, information about the state of database servers, processes and sessions.

A dynamic performance view that retrieves performance information in a multiple-server environment is referred to herein as a "global dynamic performance view" or "GV$ view". A V$ view is usually associated with a single server instance. Every V$ view has a corresponding GV$ view that can be queried to retrieve the V$ view information from all qualified database servers in the multiple-server environment. Only "read access" is allowed on GV$ views.

Parallel Querying of GV$ Views

A query that references a GV$ view (a "GV$ query") may be performed using parallel execution, in a multiple-server environment, by spawning on each remote server a slave process that returns the V$ information on that server. A query coordinator (QC) process on the server at which the GV$ query was received then combines the results from all the slaves to produce the data for the GV$ view. Because the GV$ view must reflect statistics from all qualified database servers, each qualified remote server is considered a "required participant" in the GV$ view portion of the GV$ query.

Parallel Execution of a Query Using Slave SQL

Sequential query execution uses one processor and one storage device at a time. In contrast, parallel query execution uses multiple processes to execute, in parallel, suboperations of a query. For example, virtually every query execution includes some form of manipulation of rows in a relation, or table of the database management system (DBMS). Before any manipulation can be done, the rows must be read, or scanned. In a sequential scan, the table is scanned using one process. Parallel query systems provide the ability to break up the scan such that more than one process can get involved in performance of the table scan.

Various techniques have been developed for parallelizing queries. Such techniques typically rely on an underlying query processing model. For example, one model (a "row-source model") for parallelizing queries is described, in U.S. Pat. No. 5,857,180, which was mentioned above. According to the row-source (iterator) model of SQL execution, data flows through the SQL operations modeled by a row-source in the form of row-vectors. Specifically, a parallel plan is built on the Query Coordinator (QC). The parallel plan is subdivided into sub-plans or sub-trees, each called a DFO (Data Flow Object), each of which are scheduled and run in parallel on a set of parallel execution slaves.

One of the main design issues in any parallel SQL execution engine is how to express and communicate these tasks or sub-plans to the parallel slave processes. According to one implementation of the row-source model, a specialized form of SQL, called slave SQL, is used to express such tasks or sub-plans. Slave SQL is standard SQL plus some extensions to support notions like data partitioning and flow of partitioned data from one DFO to another.

According to the same approach, the slave SQL, corresponding to each DFO, is sent to slaves. Upon receiving a slave SQL command, a slave compiles the slave SQL and executes the slave SQL using control information sent from the QC. The global parallel plan has a SQL cursor corresponding to each DFO. So, running a parallel query involves parsing, unparsing and executing a parallel cursor on the QC side and parsing and executing on a slave set one cursor per DFO.

When compiled by slaves, the DFO cursors expressed in slave SQL often generate special row-sources that a QC plan would never show. Given the complexity of this picture, parallel queries can be hard to manage, monitor and tune. Also, generating slave SQL for each DFO from the physical execution plan (comprising of row-source plus some parallel annotation) is difficult and error-prone, since the compilation structures get manipulated and transformed extensively after the high level SQL gets parsed, semantic-checked, optimized and compiled into the physical row-source plan.

As explained above, slave SQL is a means to generate the correct execution plan on the slave. To do this the database server has to add, parse and maintain special slave SQL constructs such as group-by staging operators, bitmap index specific operators, etc. Supporting slave SQL requires specialized slave-specific support from parsing all the way through execution. The amount of slave-specific support required to support the slave SQL approach results in a preponderance of slave specific code and has historically caused a large number of problems. In addition, the new constructs required by slave SQL have to be SQL expressible.

As mentioned above, one step in the generation of the slave SQL statements that are sent to the slave sets is the unparsing of the row-source tree created for the original statement, and the data-flow operators contained therein. Such unparsing operations are difficult and error-prone. Typically, the database server has to generate a (supposedly implementation free) high level representation of the operations represented by each of the data flow operators. Within a relational database system that supports the SQL language, it is natural that the SQL language is used to express such high level representations of dataflow operators.

Thus, while the original statement is parsed to derive the query plan, portions of the query plan must be "un-parsed" to produce slave SQL statements. Unfortunately, by the time the database server reaches the post-compilation phase, when unparsing for slave SQL is performed, the compilation process has modified or moved around information (e.g. predicates) that needs to be gathered together again to correctly regenerate a query. This unparsing process is very specific to the parallel execution engine and requires statement-specific support, which can be cumbersome and error-prone.

In addition, using the slave SQL approach, parallelization of new SQL operations is usually done well after the design and implementation of the serial operation. Some of the decisions taken in the compilation layers for the serial implementation (which is based on the original statement) can contradict the requirements of generation and support for slave SQL.

Parallel Shared Cursor

To avoid the problems inherent in the use of slave SQL, techniques have been developed for executing queries, or portions thereof, in parallel, in a multiple-server environment, without using slave SQL to communicate to each slave the operations to be performed by the slave. Instead of generating one cursor for the query coordinator (QC) based on the original statement, and separate cursors for each DFO based on the slave SQL, the techniques involve sharing either (1) the cursor that is generated from the original statement, or (2) an equivalent cursor, among the various participants involved in the parallel execution of the operations specified in the original statement. The model used by these techniques is referred to herein as the "Parallel Shared Cursor" (PSC) model of processing, in parallel, the operations specified in SQL queries.

The Parallel Shared-Cursor (PSC) based model provides a simpler and more manageable architecture for parallel SQL cursors. Specifically, in the PSC model, the database server builds a single cursor that contains the information needed for parallel execution, and is used for the entire parallel execution process, by both the QC and the slaves on a single instance of the database server where cursor sharing is possible. Because QC unparsing and slave parse support for slave SQL is no longer required, the support of new features, monitoring of query progression, and diagnosability of query performance, become better.

Regardless of whether a slave has access to the same cursor instance as the query coordinator, or to an instance of an equivalent cursor, the slave is privy to the same information. Significantly, that information is already in compiled form, thus avoiding the need for each slave to separately parse and compile their own cursors based on SQL fragments. Further, the information thereby available to each slave includes the complete execution plan, and is not limited to the portion of the plan that is specific to the role of that particular slave in the execution of the plan. Because the slave is exposed to this information, the slave can make intelligent decisions with respect to how to execute its portion of the plan. For example, a slave may determine how it will execute its portion of the plan based, in part, on some characteristic of the original statement. As another example, a slave may determine how it will execute its portion of the plan based, in part, on portions of the execution plan that will be executed by other slave processes.

Performing a GV$ Query Using the PSC Model

Sometimes a database server which is part of the multiple-server configuration might not have access to the physical database. For example, a database server ceases to have access to a database when the database server explicitly closes the database. However, since GV$ queries return the state of the database servers and not the state of the database, the GV$ queries have to work on database servers regardless of whether the database is currently open or closed to them.

This requirement poses a challenge to the PSC model of parallel SQL execution, because a slave on a closed database server will not have available data dictionary information, which is stored in the closed database, to resolve database objects, such as regular tables and views that could be also be referenced by the GV$ query. Failure to look up dictionary information on these objects prevents the slave on the remote server from compiling the GV$ query cursor, and thus the slave on the remote server will not participate in the parallel query. Failure of a required participant to join a GV$ query gives erroneous results, since the result of a GV$ view is supposed to include results from all qualifying database servers.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

EXAMPLE SYSTEM

Figure 1:
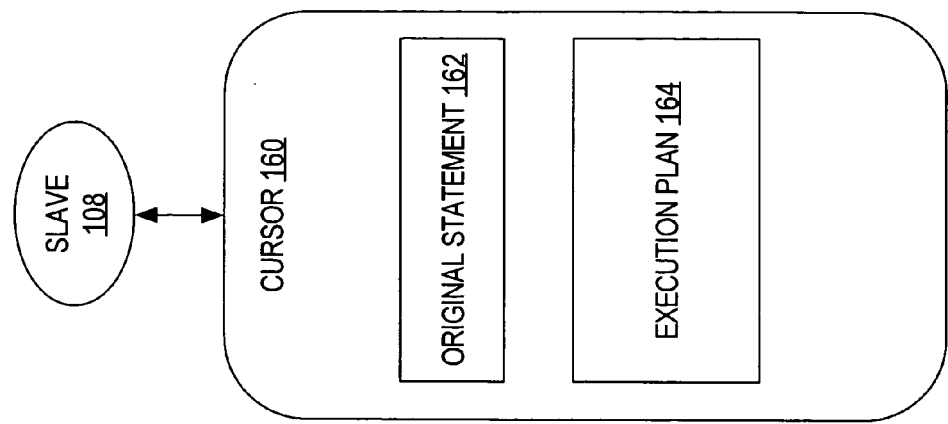
FIG. 1 is a block diagram illustrating a system in which slave processes perform work based on shared cursors and equivalent cursors, according to an embodiment of the invention.
Figure 1:
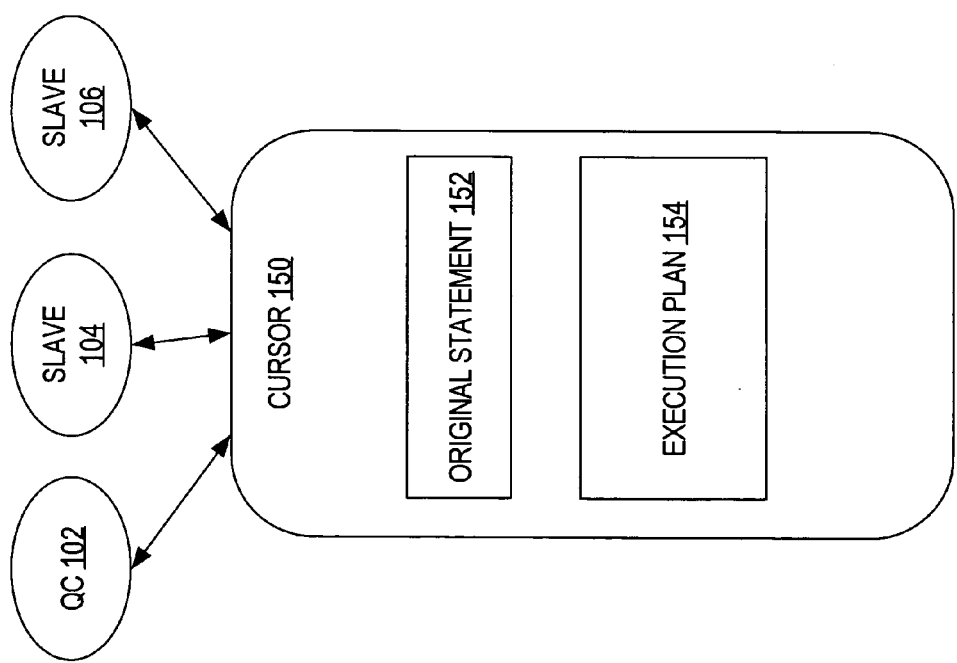

FIG. 1 is a block diagram of a system in which a single cursor is shared between several processes, according to an embodiment of the invention. Specifically, a cursor 150 has been generated by a database server based on a database statement received from a database application. In the illustrated embodiment, the cursor 150 includes the original statement 152 of the database command (typically a SQL statement) for which the cursor 150 was generated. In addition, the cursor 150 includes an execution plan 154 that describes a plan for accomplishing all of the operations specified by the original statement 152 (herein referred to as the "complete execution plan").

For the purpose of explanation, it is assumed that the database statement specifies one or more operations that can be parallelized. Consequently, the cursor 150 containing the complete execution plan is made available to a query coordinator 102 to allow the query coordinator 102 to coordinate the parallel execution of those operations.

The query coordinator 102 coordinates the parallel execution of an operation by providing to slave processes information that causes each of the slave processes to perform a portion of the parallel operation. However, the information provided to the slave processes is not in the form of slave SQL that must be separately parsed and compiled by the slave processes. Rather, as illustrated in FIG. 1, the cursor 150 that contains the execution plan 154 used by the QC is made available to the slaves. Specifically, FIG. 1 illustrates a scenario in which two slaves 104 and 106 have access to the same instance of the cursor 150 that is being used by the query coordinator, and one slave 108 that has access to a separate instance of a cursor 160 which, as shall be explained in greater detail hereafter, is an equivalent of cursor 150.

Overview of Executing GV$ Queries

If a query has a GV$ component, then the GV$ portion of the cursor has to be executed by all required participants. Consequently, the QC needs to communicate the GV$ part of the cursor to a slave on each qualified remote database server. Under the PSC model, slaves on remote servers obtain the complete plan by (1) receiving the original statement of the query, and (2) building an equivalent complete plan based on the original statement of the query.

However, as mentioned above, there may be times when a required remote participant is unable to build an equivalent complete plan. For example, a slave on a remote server will be unable to build an equivalent complete plan if the remote server has closed the database that contain objects referenced in the GV$ query. Failure to build an equivalent complete plan will prevent slaves at the remote servers from participating in the execution of the GV$ query. However, failure of any required participant to participate in the GV$ portion of a GV$ query will compromise the accuracy of the query results.

Techniques are described hereafter to achieve the benefit of the PSC model, while avoiding the problem of non-participating required participants. The techniques involve a hybrid solution in which the QC communicates to the slaves on remote servers (1) the original statement, and (2) information about the GV$ portion of the cursor. Because the GV$ portion of the cursor is provided to the slave, the slave can still participate in the GV$ operation based on the GV$ portion of the cursor even when the slave is unable to create an equivalent complete plan.

GV$ Query Execution

As mentioned above, the QC sends to each required remote participant information about the GV$ portion of the cursor. According to one embodiment, QC reconstructs a SQL statement representing only the GV$ portion of the cursor. Typically, this GV$ SQL will be a simple query containing all the columns referenced from the GV$ view. Both the original statement and the GV$ SQL statement are sent to all slaves on all remote database servers.

A slave on each remote database server receives both the original statement and the GV$ SQL, and determines whether to compile the original statement. The slave on the remote server may decide not to compile the original statement if conditions are such that the slave can tell, a priori, that the slave will not be able to generate an equivalent complete plan. For example, the state of the database server on which the slave is running may prevent the slave from generating an equivalent complete plan. Specifically, if the slave on the remote server is running in a database server that has closed a database that includes objects referenced in the original statement, then the slave will decide not to compile the complete statement because, with the database closed, the slave will not be able to compile the original statement to generate an equivalent complete plan. If the slave on the remote server decides against compiling the complete statement, then the slave compiles and executes the GV$ SQL to participate in the GV$ portion of the GV$ query. Even though all slaves (local and remote) are sent both the top level and reconstructed GV$ SQL, the remote slaves involved in the GV$ operation are those belonging to only the parallelizer which controls the GV$ part of the parallel query, and not those working on behalf of other parallelizers in the same query.

If the slave on the remote server decides to compile the complete statement, the slave compiles the complete statement and determines whether the resulting complete plan is equivalent to the master plan generated by the QC. If the slave's complete plan is equivalent to the master plan, then the slave uses the equivalent complete plan to execute the part of the plan identified by the QC. If the slave's complete plan is not equivalent to the master plan, then the slave compiles and executes the GV$ SQL to participate in the GV$ portion of the GV$ query.

According to one embodiment, communication is implicit with regard to the execution of the GV$ portion of the plan, because the QC only sends GV$ SQL when the QC is ready to collect results for a particular GV$ view from the slaves, and the QC only sends the GV$ SQL to slaves participating in the parallel execution of the GV$ portion of the plan.

EXAMPLE OF GV$ QUERY EXECUTION

To illustrate how a GV$ query is handled, according to one embodiment, an example is given hereafter of a query, where a regular parallel table is joined against a GV$ view. The plan shown below has two parallelizers PX1 and PX2. The second parallelizer PX2 controls the GV$ part of the query.

Original SQL:

select v.inst_id, tab1.col2
from tab1, gv$instance v
where tab1.col1 = v.host_name and v.inst_id ?= userenv('instance')

Query Plan:

| Id  | Operation            | Name         | IN-OUT | PQ Distrib |
|-----|----------------------|--------------|--------|------------|
| 0   | SELECT STATEMENT     |              |        |            |
| 1   | PX COORDINATOR       |              |        |            |
| 2   | PX SEND QC (RANDOM)  | :TQ20002     | P->S   | QC (RAND)  |
| *3  | HASH JOIN            |              | PCWP   |            |
| 4   | PX RECEIVE           |              | PCWP   |            |
| 5   | PX SEND HASH         | :TQ20001     | P->P   | HASH       |
| 6   | PX BLOCK ITERATOR    |              | PCWC   |            |
| 7   | TABLE ACCESS FULL    | TAB1         | PCWP   |            |
| 8   | BUFFER SORT          |              | PCWC   |            |
| 9   | PX RECEIVE           |              | PCWP   |            |
| 10  | PX SEND HASH         | :TQ20000     | S->P   | HASH       |
| 11  | PX COORDINATOR       |              |        |            |
| 12  | PX SEND QC (RANDOM)  | :TQ10000     | P->S   | QC (RAND)  |
| *13 | VIEW                 | GV$INSTANCE  | PCWP   |            |

```
                        PX1
                         |
                         : (Random)
                         |
                    HASH JOIN (1)
                         |
             ------------+------------
             |                       |
             : (Hash)                : (Hash)
             |                       |
         SCAN (tab1) (2)           PX2
                                     |
                                     : (Random)
                                     |
                              SCAN (GV$INSTANCE) (3)
```

Generated GV$ SQL:

SELECT "V"."INST_ID", "V"."HOST_NAME"
FROM "GV$INSTANCE" "V"

The graph illustrated above shows the data flow of the original query, from the data source to the result. Operations (1), (2) and (3) are parallelized. When the query coordinator running on row source PX2 is ready to receive results for GV$INSTANCE(operation (3)), it sends both the original and the GV$ SQL from the slaves participating in operation (3). If the instance where a slave is spawned has closed the database, that slave process executes the GV$ SQL and returns the corresponding V$ information on that instance.

Note that, in this example, the predicate on v.ins_id may or may not appear in the GV$ SQL. It does not appear in the GV$ SQL shown above, in which case it will be evaluated as a filter predicate by parallelizer PX2 running on the query coordinator process on the local instance after it receives rows from slaves for the GV$ view.

HARDWARE OVERVIEW

Figure 2:
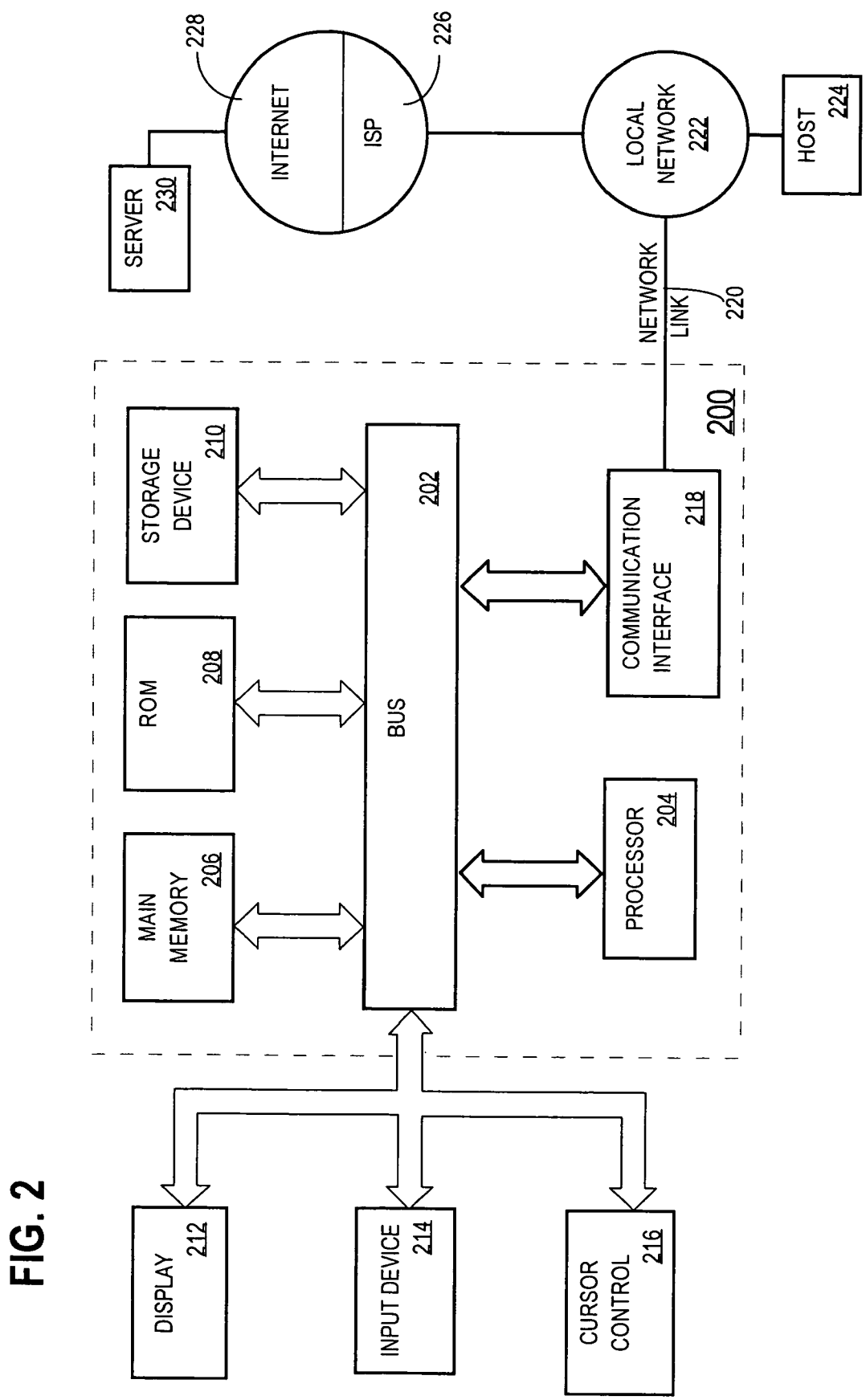
FIG. 2 is a block diagram illustrating a computer system upon which embodiments of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for processing a query within a multiple-server system, the method comprising the steps of:
   a first server identifying one or more remote servers as candidates to participate in parallel execution of at least a portion of the query;
   sending to at least one remote server of the one or more remote servers
      (a) first information for constructing a complete plan for the query; and
      (b) second information for participating in said portion of the query;
   the at least one remote server of the one or more remote servers performing the steps of
      if a set of conditions is satisfied at the remote server, then participating in parallel execution of the portion of the query based, at least in part, on a complete plan that was generated at the remote server using the first information; and
      if the set of conditions is not satisfied at the remote server, then participating in parallel execution of the portion of the query based on the second information.

2. The method of claim 1 wherein the portion of the query involves a global dynamic performance view.

3. The method of claim 2 wherein:
   the step of participating in execution includes sending dynamic performance information to the first server; and
   the first server generates aggregated dynamic performance information for the global dynamic performance view based on dynamic performance information received from each remote server of the one or more remote servers.

4. The method of claim 1 wherein the first information is an original statement of the query.

5. The method of claim 2 wherein the second information is a SQL statement which, when executed at the remote server, retrieves from the remote server dynamic performance information that is needed to generate data for the global dynamic performance view.

6. The method of claim 1 wherein:
   the query references objects in a database; and
   the set of conditions includes that the database is open at the remote server.

7. The method of claim 1 wherein:
   the method includes the steps of:
      at the remote site, using the first information to construct a complete plan for the query; and
      determining whether the complete plan generated at the remote site is equivalent to a master plan for execution the query; and
   the set of conditions includes that the complete plan generated at the remote site is equivalent to the master plan.

8. The method of claim 6 wherein:
   the method includes the steps of:
      at the remote site, using the first information to construct a complete plan for the query; and
      determining whether the complete plan generated at the remote site is equivalent to a master plan for execution the query; and
   the set of conditions further includes that the complete plan generated at the remote site is equivalent to the master plan.

9. The method of claim 1 wherein the set of conditions includes that the database server at the remote site is in a first state, and the set of conditions is not satisfied if the database server at the remote site is in a second state.

10. The method of claim 1 wherein:
    constructing the complete plan requires access to a database; and
    the second information is information for executing a portion of the query plan does not require access to the database.

11. The method of claim 1 wherein:
    the step of sending is performed by a query coordinator running on the first server;
    the query coordinator generates a top-level cursor for the query; and
    the query coordinator creates the second information by generating information that represents only a portion, of the top-level cursor, that relates to a global dynamic performance view.

12. The method of claim 11 wherein the step of generating information is performed by reconstruction an SQL statement that represents only the portion, of the top-level cursor, that relates to the global dynamic performance view.

13. The method of claim 1 wherein the step of sending to at least one remote server includes sending to each remote server of the plurality of remote servers.

14. The method of claim 1 wherein the first information is an original statement of the query, and the remote database server determines whether to compile the original statement based on a state of the remote database server.

15. The method of claim 1 wherein:
    the query specifies a global dynamic performance view; and
    the step of sending the second information is deferred until the first server is ready to collect results for the global dynamic performance view.

16. A computer-readable volatile or non-volatile medium carrying one or more sequences of instructions which, executable by one or more processors, causing the one or more processors to perform the method recited in claim 1.

17. A computer-readable volatile or non-volatile medium carrying one or more sequences of instructions which, executable by one or more processors, causing the one or more processors to perform the method recited in claim 2.

18. A computer-readable volatile or non-volatile medium carrying one or more sequences of instructions which, executable by one or more processors, causing the one or more processors to perform the method recited in claim 3.

19. A computer-readable volatile or non-volatile medium carrying one or more sequences of instructions which, executable by one or more processors, causing the one or more processors to perform the method recited in claim 4.

20. A computer-readable volatile or non-volatile medium carrying one or more sequences of instructions which, executable by one or more processors, causing the one or more processors to perform the method recited in claim 5.

21. A computer-readable volatile or non-volatile medium carrying one or more sequences of instructions which, executable by one or more processors, causing the one or more processors to perform the method recited in claim 6.

22. A computer-readable volatile or non-volatile medium carrying one or more sequences of instructions which, executable by one or more processors, causing the one or more processors to perform the method recited in claim 7.

23. A computer-readable volatile or non-volatile medium carrying one or more sequences of instructions which, executable by one or more processors, causing the one or more processors to perform the method recited in claim 8.

24. A computer-readable volatile or non-volatile medium carrying one or more sequences of instructions which, executable by one or more processors, causing the one or more processors to perform the method recited in claim 9.

25. A computer-readable volatile or non-volatile medium carrying one or more sequences of instructions which, executable by one or more processors, causing the one or more processors to perform the method recited in claim 10.

26. A computer-readable volatile or non-volatile medium carrying one or more sequences of instructions which, executable by one or more processors, causing the one or more processors to perform the method recited in claim 11.

27. A computer-readable volatile or non-volatile medium carrying one or more sequences of instructions which, executable by one or more processors, causing the one or more processors to perform the method recited in claim 12.

28. A computer-readable volatile or non-volatile medium carrying one or more sequences of instructions which, executable by one or more processors, causing the one or more processors to perform the method recited in claim 13.

29. A computer-readable volatile or non-volatile medium carrying one or more sequences of instructions which, executable by one or more processors, causing the one or more processors to perform the method recited in claim 14.

30. A computer-readable volatile or non-volatile medium carrying one or more sequences of instructions which, executable by one or more processors, causing the one or more processors to perform the method recited in claim 15.

* * * * *